(12) United States Patent
Park et al.

(10) Patent No.: US 11,626,254 B2
(45) Date of Patent: Apr. 11, 2023

(54) CAPACITOR COMPONENT

(71) Applicant: SAMSUNG ELECTRO-MECHANICS CO., LTD., Suwon-si (KR)

(72) Inventors: Yong Park, Suwon-si (KR); Jong Ho Lee, Suwon-si (KR); Woo Chul Shin, Suwon-si (KR); Ki Pyo Hong, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 17/503,832

(22) Filed: Oct. 18, 2021

(65) Prior Publication Data

US 2022/0037089 A1  Feb. 3, 2022

Related U.S. Application Data

(63) Continuation of application No. 16/843,247, filed on Apr. 8, 2020, now Pat. No. 11,250,992.

(30) Foreign Application Priority Data

Jul. 2, 2019 (KR) .................. 10-2019-0079455

(51) Int. Cl.
*H01G 4/30* (2006.01)
*H01G 4/012* (2006.01)
(Continued)

(52) U.S. Cl.
CPC ............ *H01G 4/30* (2013.01); *H01G 2/02* (2013.01); *H01G 4/012* (2013.01);
(Continued)

(58) Field of Classification Search
CPC .......... H01G 4/30; H01G 2/02; H01G 4/1218; H01G 4/248; H01G 4/012; H01G 4/1209;
(Continued)

(56) References Cited

U.S. PATENT DOCUMENTS 5,339,068 A * 8/1994 Tsunoda ............... H01C 1/142
                                                338/308
10,079,108 B2   9/2018 Hatanaka et al.
(Continued)

FOREIGN PATENT DOCUMENTS

CN    102623178 A    8/2012
CN    107004506 A    8/2017
(Continued)

OTHER PUBLICATIONS

Chinese Office Action dated Apr. 28, 2022 issued in Chinese Patent Application No. 202010625935.4 (with English translation).
(Continued)

*Primary Examiner* — Michael P McFadden
(74) *Attorney, Agent, or Firm* — Morgan, Lewis & Bockius LLP

(57) ABSTRACT

A capacitor component includes a body including a layered portion having alternately stacked first and second internal electrodes laminated with dielectric layers interposed therebetween in a first direction, and first and second connecting portions disposed on two opposing surfaces of the layered portion, respectively, in a second direction perpendicular to the first direction and electrically connected to the first and second internal electrodes, respectively. The first and second connecting portions each include a metal layer disposed on the layered portion, a ceramic layer disposed on the metal layer, and an exposed portion penetrating through the ceramic layer to be in contact with the metal layer.

23 Claims, 12 Drawing Sheets

(51) Int. Cl.
*H01G 2/02* (2006.01)
*H01G 4/33* (2006.01)
*H01G 4/232* (2006.01)
*H01G 4/12* (2006.01)

(52) U.S. Cl.
CPC ......... *H01G 4/1218* (2013.01); *H01G 4/2325* (2013.01); *H01G 4/33* (2013.01)

(58) Field of Classification Search
CPC .... H01G 4/232; H01G 4/0085; H01G 4/1227; H01G 4/2325; H01G 4/33
See application file for complete search history.

(56) References Cited

U.S. PATENT DOCUMENTS

| | | |
|---|---|---|
| 2012/0194031 A1 | 8/2012 | Ogawa et al. |
| 2015/0021073 A1 | 1/2015 | Kim |
| 2016/0027584 A1 | 1/2016 | Hattori |
| 2016/0351332 A1* | 12/2016 | Lee ........................ H01G 4/232 |
| 2017/0154731 A1 | 6/2017 | Tahara |
| 2017/0330689 A1* | 11/2017 | Hatanaka ................. H01G 2/06 |
| 2018/0082787 A1* | 3/2018 | Hamamori ........... H01G 4/2325 |
| 2018/0096791 A1 | 4/2018 | Nishisaka et al. |
| 2018/0174753 A1* | 6/2018 | Terashita ............... H01G 4/232 |
| 2018/0190433 A1 | 7/2018 | Cho et al. |
| 2019/0355518 A1* | 11/2019 | Harada .................... H01G 4/30 |

FOREIGN PATENT DOCUMENTS

| | | |
|---|---|---|
| CN | 108269688 A | 7/2018 |
| JP | 2016-025301 A | 2/2016 |
| JP | 2018-060875 A | 4/2018 |
| KR | 10-2015-0011263 A | 1/2015 |

OTHER PUBLICATIONS

U.S. Non-final Office Action dated Jul. 23, 2021 issued in U.S. Appl. No. 16/843,247.

* cited by examiner

CAPACITOR COMPONENT

CROSS-REFERENCE TO RELATED APPLICATION(S)

This application is a continuation of U.S. patent application Ser. No. 16/843,247, filed on Apr. 8, 2020, which claims the benefit of priority to Korean Patent Application No. 10-2019-0079455 filed on Jul. 2, 2019, the entire disclosures of which are incorporated herein by reference.

TECHNICAL FIELD

The present disclosure relates to a capacitor component.

BACKGROUND

A multilayer ceramic capacitor (MLCC), a capacitor component, has a small size and high capacitance, and may be easily mounted.

Generally, when external electrodes are formed in an MLCC, a paste including a conductive metal may be used, and a surface of a body on which an internal electrode is exposed may be dipped in the paste.

However, a thickness of an external electrode formed by the dipping method may not be uniform, and a thickness of an external electrode may be excessively reduced on a corner of a body. Also, when a plating layer is formed on an external electrode, a plating solution may permeate into a body, which may decrease reliability of an MLCC.

To address the issues described above, an external electrode may be divided into a primary external electrode and a secondary external electrode, and the primary external electrode may be formed by a transcribing process, or the like. However, when the above-described method is used, a contact area between an internal electrode and an external electrode may be reduced as compared to using a general method, and accordingly, resistance and ESR may increase.

SUMMARY

An aspect of the present disclosure is to provide a capacitor component having improved moisture resistance reliability.

Another aspect of the present disclosure is to provide a capacitor component having decreased ESR by improving electrode connectivity.

Another aspect of the present disclosure is to provide a capacitor component having improved contact properties which may prevent delamination.

According to an aspect of the present disclosure, a capacitor component includes a body including a layered portion having alternately stacked first and second internal electrodes laminated with dielectric layers interposed therebetween in a first direction, and first and second connecting portions disposed on two opposing surfaces of the layered portion, respectively, in a second direction perpendicular to the first direction and electrically connected to the first and second internal electrodes, respectively, and the first and second connecting portions each include a metal layer disposed on the layered portion, a ceramic layer disposed on the metal layer, and an exposed portion penetrating through the ceramic layer to be in contact with the metal layer.

According to another aspect of the present disclosure, a capacitor component includes a body including a layered portion having alternately stacked first and second internal electrodes laminated with dielectric layers interposed therebetween in a first direction, first and second metal layers disposed on two opposing surfaces of the layered portion, respectively, in a second direction perpendicular to the first direction and electrically connected to the first and second internal electrodes, respectively, first and second exposed portions respectively disposed on central portions of outer surfaces of the first and second metal layers to be electrically connected to the first and second metal layers, and first and second ceramic layers respectively disposed on remaining portions of the outer surfaces of the first and second metal layers, the remaining portions surrounding the central portions, respectively.

BRIEF DESCRIPTION OF DRAWINGS

The above and other aspects, features, and advantages of the present disclosure will be more clearly understood from the following detailed description, taken in conjunction with the accompanying drawings, in which:

FIG. 5A is a cross-sectional diagram illustrating a first internal electrode, and FIG. 5B is a cross-sectional diagram illustrating a second internal electrode;

DETAILED DESCRIPTION

Figure 1:
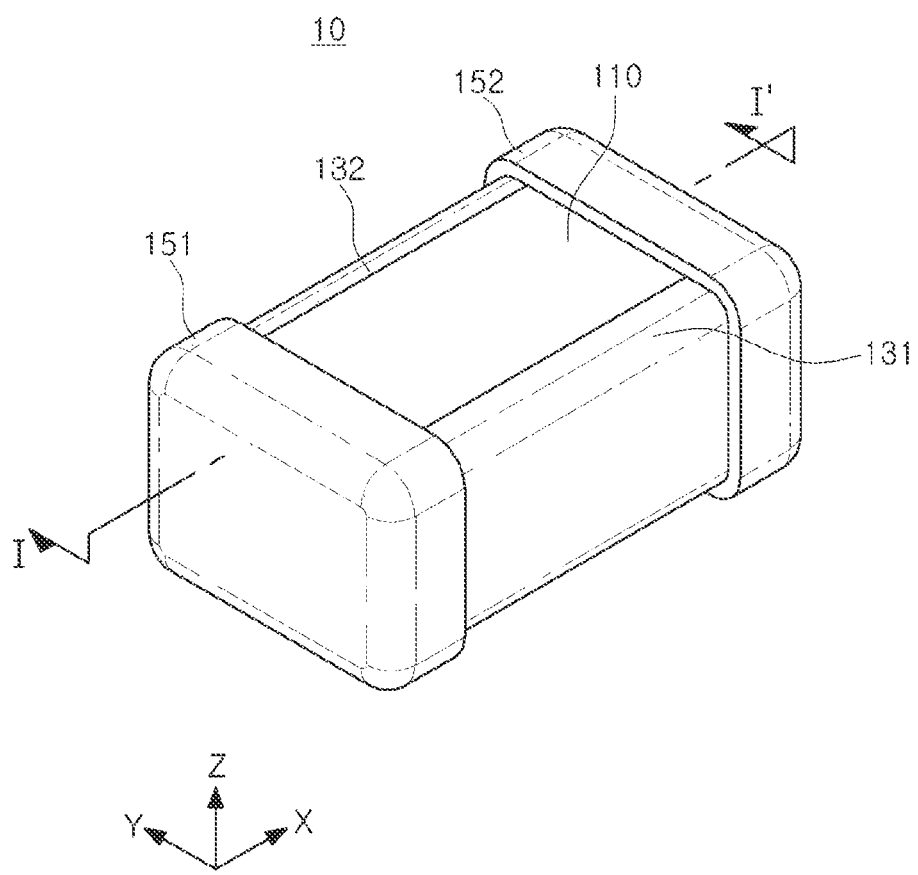
FIG. 1 is a perspective diagram illustrating a capacitor component according to an exemplary embodiment of the present disclosure.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another exemplary embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

In the diagram, an X direction may be defined as a second direction, an L direction, or a length direction, a Y direction may be defined as a third direction, a W direction, or a width direction, and a Z direction may be defined as a first direction, a T direction, or a thickness direction.

In the description below, a capacitor component will be described in greater detail with reference to FIGS. 1 to 5.

A capacitor component 10 may include a body 100 including a dielectric layer 111, a layered portion 110 in which first and second internal electrodes 121 and 122 opposing each other are layered in a first direction (Z direction), and first and second connecting portions 141 and 142 disposed on both surfaces of the layered portion in a second direction (X direction) perpendicular to the first direction, respectively, and electrically connected to the first and second internal electrodes 121 and 122, and the first and second connecting portions 141 and 142 include metal layers 141a and 142a disposed on the layered portion 110, ceramic layers 141b and 142b disposed on the metal layers 141a and 142a, and exposed portions 143 and 144 penetrating the ceramic layers 141b and 142b and in contact with the metal layers 141a and 142a, respectively.

In an exemplary embodiment of the present disclosure, the body 100 may include the layered portion 110 and the first and second connecting portions 141 and 142.

A shape of the body 100 may not be limited to any particular shape, and the body 100 may have a hexahedral shape or a shape similar to a hexahedron. Due to contraction of ceramic powder included in the body 100 during a sintering process, the body 100 may not have an exact hexahedral shape with straight lines, but may have a substantially hexahedral shape. The body 100 may have a first surface 1 and a second surface 2 opposing each other in a thickness direction (Z direction), a third surface 3 and a fourth surface 4 connected to the first surface 1 and the second surface 2 and opposing each other in a length direction (X direction), and a fifth surface 5 and a sixth surface 6 connected to the first surface 1 and the second surface 2 and the third surface 3 and the fourth surface 4 and opposing each other in a width direction (Y direction).

In an exemplary embodiment of the present disclosure, in the layered portion 110, the dielectric layer 111 and the first and second internal electrodes 121 and 122 may be alternately layered, and the dielectric layer 111 and the first and second internal electrodes 121 and 122 may be layered in a first direction. A plurality of the dielectric layers 111 included in the layered portion 110 may be in a sintered state, and the dielectric layers may be integrated such that it may be difficult to identify boundaries between adjacent dielectric layers without using a scanning electron microscope (SEM).

In the exemplary embodiment of the present disclosure, a material of the dielectric layer 111 may not be limited to any particular material as long as sufficient capacitance can be obtained. For example, the dielectric layer 111 may be formed using a barium titanate material, a Perovskite material compound with lead (Pb), a strontium titanate material, or the like.

As the material of the dielectric layer 111, a barium titanate (BaTiO3) powder, or the like, including various ceramic additives, organic solvents, coupling agents, dispersing agents, and the like, may be used depending on an intended purpose.

The layered portion may be formed by alternately layering a ceramic green sheet on which the first internal electrode 121 is printed and a ceramic green sheet on which the second internal electrode 122 is printed on the dielectric layer 111 in a thickness direction (Z direction).

In an exemplary embodiment of the present disclosure, a plurality of the internal electrodes 121 and 122 may oppose each other with the dielectric layer 111 interposed therebetween. The internal electrodes 121 and 122 may include the first and second internal electrodes 121 and 122 alternately disposed with the dielectric layer 111 interposed therebetween and opposing each other.

The first internal electrode 121 may only be exposed to one surface of the layered portion 110 taken in the second direction (X direction), and the portion exposed to the one surface in the second direction (X direction) may be connected to the metal layer 141a of the first connecting portion. The second internal electrode 122 may be exposed to the other surface of the layered portion 110 in the second direction (X direction), and the portion exposed to the other surface in the second direction (X direction) may be connected to the metal layer 142a of the second connecting portion. The first and second internal electrodes 121 and 122 may be electrically isolated from each other by the dielectric layer 111 interposed therebetween.

A material of the first and second internal electrodes 121 and 122 is not limited to any particular material. For example, the first and second internal electrodes 121 and 122 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof, for example. As a method of printing the conductive paste, a screen printing method, a gravure printing method, or the like, may be used, but the printing method is not limited thereto.

An average thickness of the first and second internal electrodes 121 and 122 may be 0.4 µm or less. The average thickness of the first and second internal electrodes 121 and 122 may be an average of thicknesses measured in different five positions of the sintered internal electrode. A lower limit of the average thickness of the first and second internal electrodes 121 and 122 is not limited to any particular thickness, and may be 0.01 µm or higher, for example.

In the exemplary embodiment of the present disclosure, the first and second connecting portions 141 and 142 may include the metal layers 141a and 142a disposed on the layered portion 110, the ceramic layers 141b and 142b disposed on the metal layers 141a and 142a, and the exposed portions 143 and 144 penetrating the ceramic layers 141b and 142b and in contact with the metal layers 141a and 142a, respectively.

The metal layers 141a and 142a may be disposed on one surface and the other surface of the layered portion 110 in the second direction (X direction), respectively, and may be electrically connected to the first and second internal electrodes 121 and 122, respectively.

The metal layers 141a and 142a may include a metal material having high electrical conductivity, and to increase electrical connectivity with the first internal electrode 121, the metal layers 141a and 142a may include the same metal as a material included in the first internal electrode 121. For example, the metal layers 141a and 142a may include one or more of silver (Ag), palladium (Pd), gold (Au), platinum (Pt), nickel (Ni), tin (Sn), copper (Cu), tungsten (W), titanium (Ti), and alloys thereof.

The metal layers 141a and 142a may be provided in a form of sintered electrodes, and may be simultaneously sintered with the body 100. In this case, the metal layers 141a and 142a before being sintered may include an organic material such as metal particles and a binder and may be transcribed on the body 100, and the organic material, and the like, may be removed after a sintering process.

A thickness ta of the metal layer may be 1 to 10 μm, for example. The thickness ta of the metal layer may refer to a length of the metal layer taken in the second direction (X direction). The thickness ta of the metal layer may be 1.0 μm or higher, 1.5 μm or higher, or 2.0 μm or higher, and may be 10.0 μm or lower, 9.5 μm or lower, 9.0 μm or lower, 8.5 μm or lower, 8.0 μm or lower, 7.5 μm or lower, or 7.0 μm or lower. However, the thickness of the metal layer is not limited thereto. As the thickness of the metal layer satisfies the above-mentioned thickness ranges, connectivity with the internal electrode may be secured, and electrical conductivity with the external electrode may be secured.

The ceramic layers 141b and 142b may be disposed on the metal layers 141a and 142a, and may improve sealing properties such that permeation of moisture or a plaiting solution into the body 100 may be significantly reduced. The ceramic layers 141b and 142b may be configured to not cover surfaces of the metal layers 141a and 142a taken in the first direction (Z direction) and the third direction (Y direction).

The ceramic layers 141b and 142b may be formed of a ceramic material such as barium titanate, and the like. In this case, the ceramic layers 141b and 142b may include the same ceramic material as a material included in the dielectric layer 111, or may be formed of the same material as a material of the dielectric layer 111.

The ceramic layers 141b and 142b may be formed by a transcribing process as the metal layers 141a and 142a, and may go through a sintering process thereafter. It may be preferable for the ceramic layers 141b and 142b before being sintered to have high adhesive force for a transcribing process, and thus, the ceramic layers 141b and 142b may include a relatively large amount of an organic material such as a binder, and the like. In this case, as an organic material may partially remain after a sintering process, the ceramic layers 141b and 142b may include a greater amount of an organic material than an organic material included in the dielectric layer 111.

A thickness tb of the ceramic layer may be 3 to 15 μm, for example. The thickness tb of the ceramic layer may refer to a length of the ceramic layer taken in the second direction (X direction). The thickness tb of the ceramic layer may 3.0 μm or higher, 3.5 μm or higher, 4.0 μm or higher, 4.5 μm or higher, or 5.0 μm or higher, and may be 15.0 μm or lower, 14.5 μm or lower, 14.0 μm or lower, 13.5 μm or lower, 13.0 μm or lower, 12.5 μm or lower, 12.0 μm or lower, 11.5 μm or lower, 11.0 μm or lower, 10.5 μm or lower, or 10.0 μm or lower. However, an example of the thickness is not limited thereto. When the thickness of the ceramic layer satisfies the above-described ranges, moisture resistance reliability may be secured, and strength of the capacitor component may increase.

The exposed portions 143 and 144 may be disposed in the ceramic layers 141b and 142b, and each may have a shape penetrating the ceramic layers 141b and 142b. The configuration in which the exposed portions 143 and 144 penetrate the ceramic layers 141b and 142b may indicate that one side surfaces of the exposed portions 143 and 144 may be in contact with the metal layers 141a and 142a, and the other side surfaces of the exposed portions 143 and 144 may be exposed externally of the body 100. Also, when the exposed portions 143 and 144 are configured to penetrate the ceramic layers 141b and 142b, one side surfaces of the exposed portions 143 and 144 may be in contact with the metal layers 141a and 142a, and the other side surfaces of the exposed portions 143 and 144 may be in contact with external electrodes 151 and 152.

Figure 2:
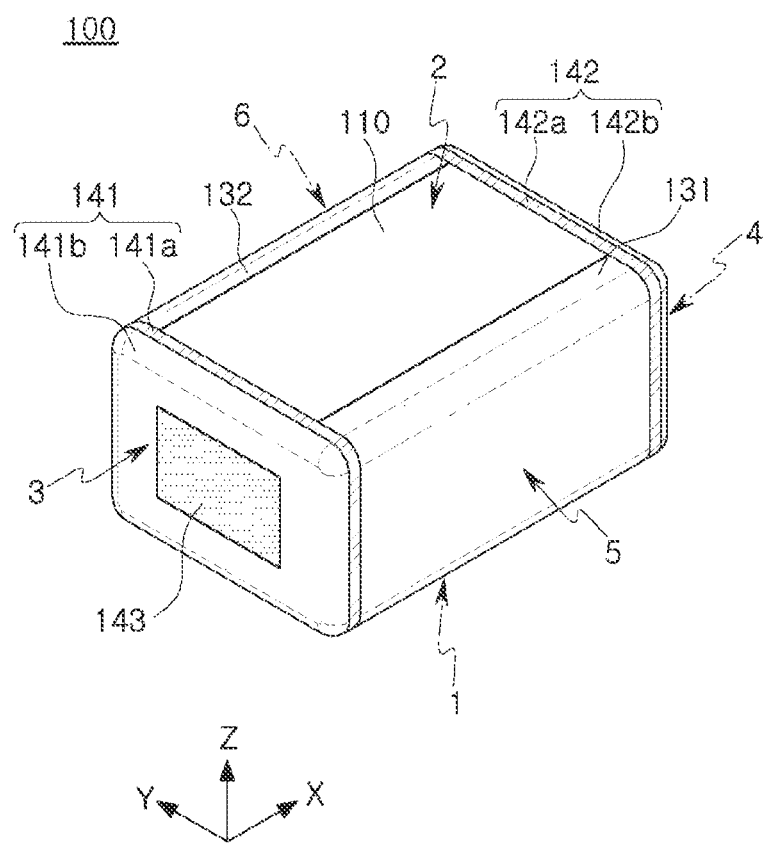
FIG. 2 is a perspective diagram illustrating the body illustrated in FIG. 1.
Figure 3:
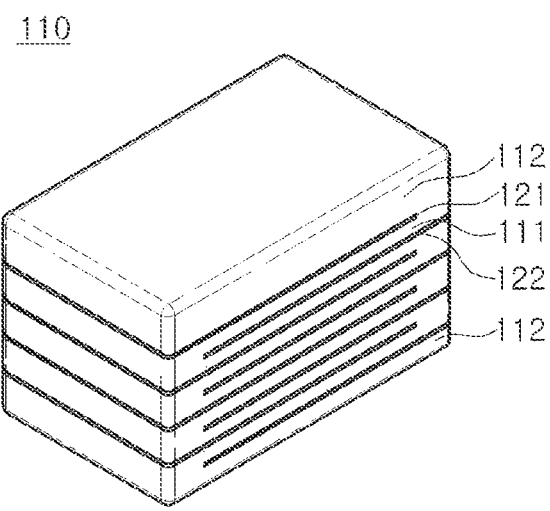
FIG. 3 is a perspective diagram illustrating the layered portion illustrated in FIG. 1.
Figure 4:
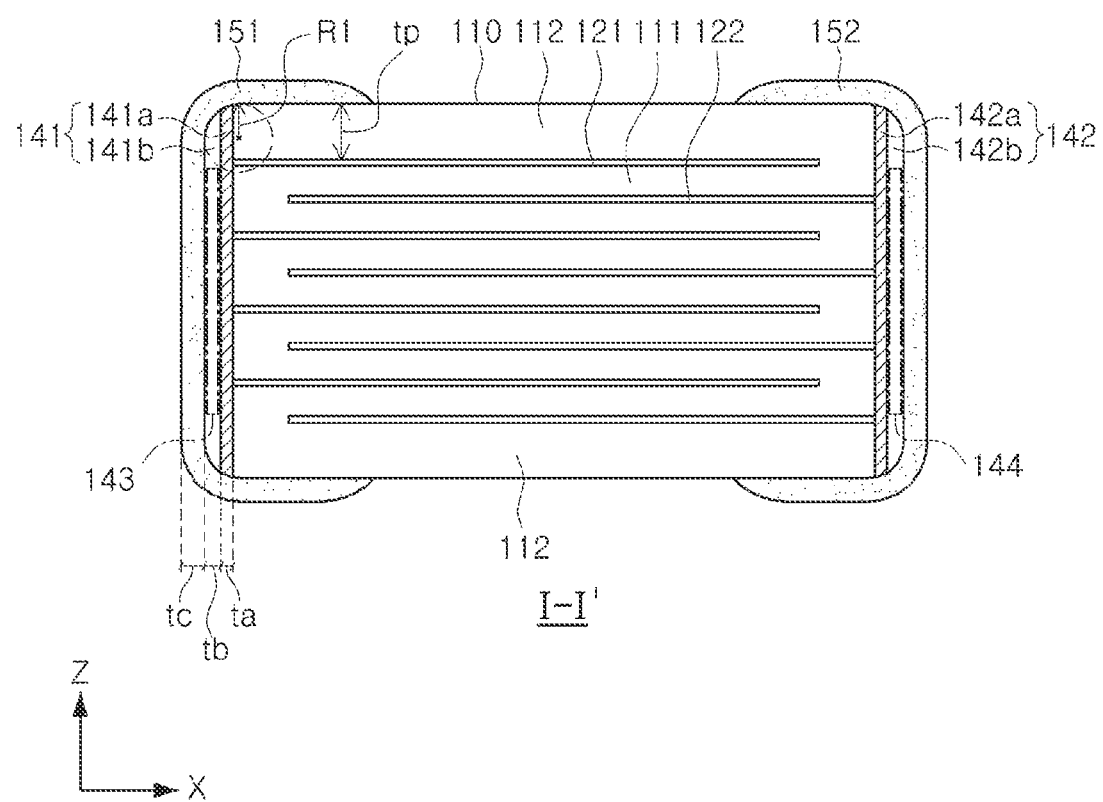
FIG. 4 is a cross-sectional diagram taken along line I-I' in FIG. 1.

FIGS. 2, 4, 5A and 5B are diagrams illustrating a body 100 in which exposed portions 143 and 144 penetrating ceramic layers 141b and 142b and in contact with metal layers 141a and 142a are formed, and a capacitor component 10 including the body 100. Referring to FIGS. 2, 4, and 5, the exposed portions 143 and 144 disposed in the ceramic layers 141b and 142b may penetrate the ceramic layers 141b and 142b and may be in contact with the metal layers 141a and 142a. In the configuration, the exposed portions 143 and 144 may function as conductive paths connecting the metal layers 141a and 142a electrically connected to the first and second internal electrodes 121 and 122 to the external electrodes 151 and 152. Accordingly, a contact area between the internal electrodes and the external electrodes may increase, and ESR may decrease, as compared to a configuration in which only the metal layers 141a and 142a and the external electrodes 151 and 152 are connected to each other.

In an exemplary embodiment of the present disclosure, a ratio (A/B) of an area A of the exposed portions 143 and 144 in contact with the metal layers 141a and 142a to an area B of the metal layers 141a and 142a may be 0.7 or less. The area B of the metal layers 141a and 142a and the area A of the exposed portions 143 and 144 in contact with the metal layers 141a and 142a may be measured with reference to cross-sectional surfaces taken in the first and third directions (a Y-Z cross-sectional surface). For example, as in FIG. 2, an area of the second surface or the third surface of the body 100 may be the area B of the metal layers 141a and 142a, and the area A of the exposed portions 143 and 144 may be an area of a portion exposed to the second surface or the third surface of the body 100. The ratio (A/B) of the area A of the exposed portions 143 and 144 in contact with the metal layers 141a and 142a to the area B of the metal layers 141a and 142a may be 0.7 or lower, 0.6 or lower, or 0.5 or lower, and a lower limit may not be limited to any particular value. For example, the lower limit may be 0.01 or higher. As the ratio (A/B) satisfies the above-described range, improved moisture resistance reliability may be implemented, and ESR may decrease.

Figure 6A:
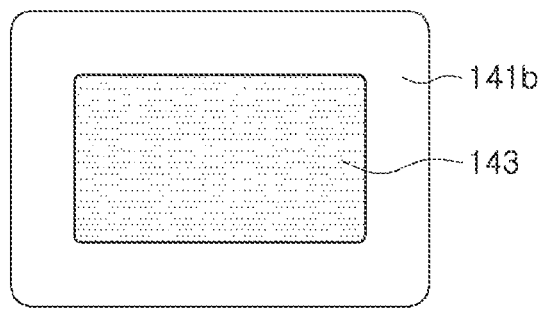
FIGS. 6A, 6B, 7A and 7B are diagrams illustrating a connecting portion in which an exposed portion is formed.
Figure 6B:
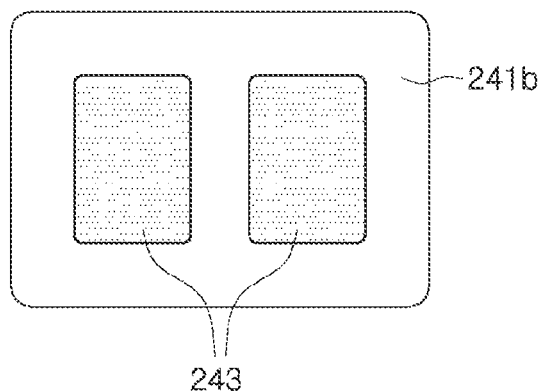

FIGS. 6A and 6B illustrate examples of an exposed portion. Referring to FIG. 6A, an exposed portion 143 may have a rectangular shape, and a ceramic layer 141b may be disposed around the exposed portion 143. Also, referring to FIGS. 6B, two or more exposed portions 243 may be provided, and a ceramic layer 241b may be disposed around the two or more exposed portions 243.

Figure 7A:
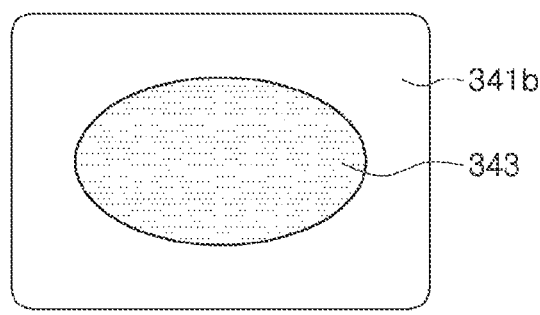
Figure 7B:
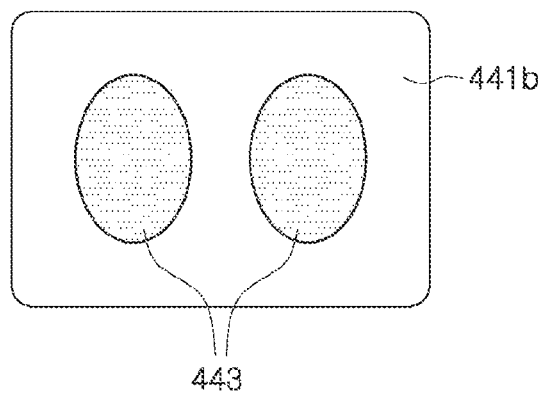

FIGS. 7A and 7B illustrate another example of an exposed portion. Referring to FIG. 7A, an exposed portion 343 may have a circular shape, and a ceramic layer 341b may be disposed around the exposed portion 343. Also, referring to FIG. 7B, two or more exposed portions 443 may be provided, and a ceramic layer 441b may be disposed around the two or more exposed portions 443.

A shape and the number of the exposed portions described with reference to FIGS. 6A, 6B, 7A and 7B may not be limited to the example illustrated in FIGS. 6A, 6B, 7A and 7B, and may be varied.

In the exemplary embodiment of the present disclosure, exposed portions 143 and 144 may include a metal material having high electrical conductivity, and to improve electrical connectivity with the metal layers 141a and 142a, the exposed portions 143 and 144 may include the same metal as a metal included in the metal layers 141a and 142a. For example, the exposed portions 143 and 144 may include one or more of silver (Ag), palladium (Pd), gold (Au), platinum (Pt), nickel (Ni), tin (Sn), copper (Cu), tungsten (W), titanium (Ti), and alloys thereof.

The exposed portions 143 and 144 may be provided in a form of sintered electrodes, and may be simultaneously sintered with the body 100. In this case, the exposed portions 143 and 144 before being sintered may include an organic material such as a metal particle and a binder and may be transcribed on the metal layers 141a and 142a. After a sintering process, the organic material, and the like, may be removed.

In the exemplary embodiment of the present disclosure, the first and second connecting portions 141 and 142 may be formed by a method of transcribing a sheet. The method of transcribing the sheet is not limited to any particular method. For example, a ceramic layer having a sheet form and a metal layer having a sheet form including a exposed portion may be transcribed on the body, and the sheets may have a uniform thickness. Accordingly, a ratio of a minimum value of a thickness of each of the connecting portions 141 and 142 to a maximum value may be 0.9 to 1.0. The thickness of each of the connecting portions 141 and 142 may refer to a length of each of the connecting portions 141 and 142 taken in the second direction (X direction).

According to another exemplary embodiment of the present disclosure, each of corners of the body 100 on cross-sectional surfaces taken in the first and second directions may have a rounded shape. By having the rounded shape, the external electrodes 151 and 152 may have a reduced and uniform thickness.

When each of corners of the body has an angled shape, a chipping defect, breakage of corners caused by collision between chips, may occur during a process of manufacturing an MLCC, which may cause an exterior defect and may degrade moisture resistance reliability. To address the issue, generally, corners of a body may be ground to have a rounded shape to prevent a thickness of an external electrode on the corners from being reduced and to prevent a chipping defect.

However, by grinding the corners of the body, exposure of an internal electrode, or other issues, may occur such that it may be difficult to secure a sufficiently rounded shape on each of corners of a body in a general capacitor component. Also, to prevent the exposure of an internal electrode, when a thickness of a protective portion is increased, capacitance per unit volume of a capacitor component may decrease.

In the exemplary embodiment of the present disclosure, by disposing the first and second connecting portions 141 and 142 on both surfaces of the layered portion 110 taken in the second direction (X direction), a sufficiently rounded shape may be formed on the corners of the body 100. Accordingly, a thickness of an external electrode on each corner may be prevented from being reduced without a decrease of capacitance per unit volume, and a chipping defect may be prevented.

In an exemplary embodiment of the present disclosure, the layered portion 110 may include a capacitance forming portion, capacitance of which includes the first and second internal electrodes 121 and 122 opposing each other with the dielectric layer 111 interposed therebetween, and a protective portion 112 disposed on an upper portion and a lower portion of the capacitance forming portion.

Upper and lower protective portions may have a composition the same as a composition of the dielectric layer 111, and may be formed by layering at least one or more dielectric layers which do not include an internal electrode in an upper portion of an uppermost internal electrode and in a lower portion of a lowermost internal electrode of the body 100.

The upper and lower protective portions 112 may prevent a damage to an internal electrode caused by physical or chemical stress.

A thickness tp of each of the upper and lower protective portions 112 may be 25 µm or lower, for example. The thickness tp of each of the upper and lower protective portions 112 may be 25 µm or lower, 24 µm or lower, 23 µm or lower, 22 µm or lower, 21 µm or lower, or 20 µm or lower. In an example embodiment of the present disclosure, by disposing the connecting portions 141 and 142 in the layered portion 110, a sufficiently rounded shape may be formed on the corners of the body 100, and accordingly, by significantly reducing the thickness tp of each of the upper and lower protective portions, capacitance per unit volume of the capacitor component 10 may improve.

For example, even when the thickness tp is 20 µm or less, a sufficiently rounded shape may be formed, and an internal electrode may be protected. Accordingly, capacitance per unit volume of the capacitor component may improve. Thus, when the thickness t p is 20 µm or less, the above-described effect may be more prominent.

A lower limit of the thickness tp is not limited to any particular size, and may be selected in consideration of a radius of curvature R1 of a corner of the body 100 on cross-sectional surfaces taken in the first and second directions. For example, a lower limit of the thickness tp may be 5 µm or higher.

The thickness tp of each of the upper and lower protective portions 112 may refer to a length of each of the upper and lower protective portions 112 taken in the first direction (X direction).

Referring to FIG. 4, when a thickness of each of the upper and lower protective portions 112 is defined as tp, a radius of curvature of each of corners of the body 100 on cross-sectional surfaces taken in the first and second directions (a Z-X cross-sectional surface and an L-T cross-sectional surface) is defined as R1, R1/tp may be 0.3 or higher 1.4 or lower.

When the R1/tp is less than 0.3, it may be impossible to form a sufficiently rounded shape such that a chipping defect may occur, or a thickness of an external electrode on the corner portion may decrease.

When the R1/tp is greater than 1.4, a short caused by exposure of an internal electrode may occur, or it may be difficult to form an external electrode. A short caused by exposure of an internal electrode may refer to a phenomenon in which, as the corners of the body 100 are ground, the first internal electrode 121 may be exposed to a surface on which the second external electrode 152 is disposed and may be connected to the second external electrode 152, or in which the second internal electrode 122 is exposed to a surface on which the first external electrode 151 is disposed and may be connected to the first external electrode 151.

R1/tp may be greater than 1.0 and 1.4 or less.

When the connecting portions 141 and 142 are not provided, and R1/tp is controlled to be greater than 1.0, it may be highly likely that a short caused by exposure of an internal electrode may occur. However, when the connecting portions 141 and 142 are provided as in the exemplary embodiment, a possibility of a short caused by exposure of an internal electrode may significantly decrease even when R1/tp is controlled to be greater than 1.0 and 1.4 or less.

A rounded shape of each of the corners of the body 100 on the cross-sectional surfaces taken in the first and second directions may be formed on the connecting portions 141 and 142, and may extend to a portion of the layered portion 110 as illustrated in FIGS. 4 and 5.

In an exemplary embodiment of the present disclosure, first and second margin portions 131 and 132 may be disposed on both surfaces (a fifth surface and a sixth surface) of the layered portion 110 taken in a third direction (Y direction) perpendicular to the first and second directions, respectively.

In a general capacitor component, an area of a dielectric layer may be configured to be greater than an area of an internal electrode, and a margin region may be formed on a remaining circumferential portion other than a portion of an internal electrode connected to an external electrode. In this case, however, when several tens to several hundreds of dielectric layers are layered, the dielectric layers may be elongated to fill a difference, and accordingly, an internal electrode may be bent. When an internal electrode is bent, breakdown voltage (BDV) properties may decrease in the respective portion.

Thus, in the capacitor component in the exemplary embodiment, a difference caused by an internal electrode may be prevented by removing the margin regions on both surfaces of the layered portion 110 taken in the third direction, and an internal electrode may be prevented from being bent. Accordingly, the issue of a decrease of breakdown voltage (BDV) properties may be prevented, thereby improving reliability of the capacitor component.

In addition, by disposing the first and second margin portions 131 and 132 on both surfaces of the layered portion 110 taken in the third direction, the internal electrodes may be protected. Also, as the first and second margin portions 131 and 132 are separately formed, it may not be necessary to consider a manufacturing error such as disarrangement of internal electrodes, and the like. Thus, as a thickness Wm of each of the first and second margin portions 131 and 132 may be configured to be less than a thickness of a margin region in a general capacitor component, capacitance per unit volume of the capacitor component may improve.

Thus, when the body 100 includes the first and second margin portions 131 and 132, the first internal electrode 121 may be exposed to both surfaces of the layered portion 110 taken in the third direction and one surface of the layered portion 110 taken in the second direction, and the portion exposed to one surface taken in the second direction may be connected to the first connecting portion 141. Also, the second internal electrode 122 may be exposed to both surfaces of the layered portion 110 taken in the third direction and the other surface of the layered portion 110 taken in the second direction, and the portion exposed to the other surface taken in the second direction may be connected to the second connecting portion 142.

The first and second margin portions 131 and 132 may be formed of an insulating material, and may be formed of a ceramic material such as barium titanate. In this case, the first and second margin portions 131 and 132 may include the same ceramic material as a material included in the dielectric layer 111, or may be formed of the same material as a material included in the dielectric layer 111.

A method of forming the first and second margin portions 131 and 132 may not be limited to any particular method. For example, the first and second margin portions 131 and 132 may be formed by coating a slurry including ceramic, or by layering dielectric sheets on both surfaces of the layered portion, taken in the third direction, in the third direction.

The first and second margin portions 131 and 132 may also be formed by transcribing dielectric sheets using the above-described transcribing process. Accordingly, each of the first and second margin portions 131 and 132 may have a uniform thickness. When a thickness of each of the first and second margin portions 131 and 132 is defined as Wm, a ratio of a minimum value of the thickness Wm to a maximum value may be 0.9 to 1.0.

When the first and second margin portions 131 and 132 are formed by transcribing dielectric sheets, it may be preferable for the first and second margin portions 131 and 132 before being sintered to have high adhesion force for the transcribing process. To this end, the first and second margin portions 131 and 132 may include a relatively great amount of an organic material such as a binder. In this case, as the organic material may partially remain after a sintering process, the first and second margin portions 131 and 132 may include a greater amount of an organic material than an amount of an organic material included in the dielectric layer 111.

The thickness Wm of each of the first and second margin portions 131 and 132 may not be limited to any particular size. In an exemplary embodiment of the present disclosure, as a sufficiently rounded shape may be formed on the corners of the body 100 by disposing the connecting portions 141 and 142 in the layered portion 110, by significantly reducing the thickness Wm, capacitance per unit volume of the capacitor component may improve. For example, in an exemplary embodiment of the present disclosure, even when the thickness Wm is 15 μm or less, a sufficiently rounded shape may be formed, and the internal electrodes 121 and 122 may also be protected, thereby improving capacitance per unit volume of the capacitor component.

A lower limit of the thickness Wm may not be limited to any particular size, and may be selected in consideration of the radius of curvature R2 of the corner of the body on cross-sectional surfaces taken in the second and third directions (an X-Y cross-sectional surface and an L-W cross-sectional surface). For example, the thickness Wm may be 5 μm or greater. The thickness Wm of each of the first and second margin portions 131 and 132 may refer to a length of each of the first and second margin portions 131 and 132 taken in the third direction (Y direction).

Figure 5A:
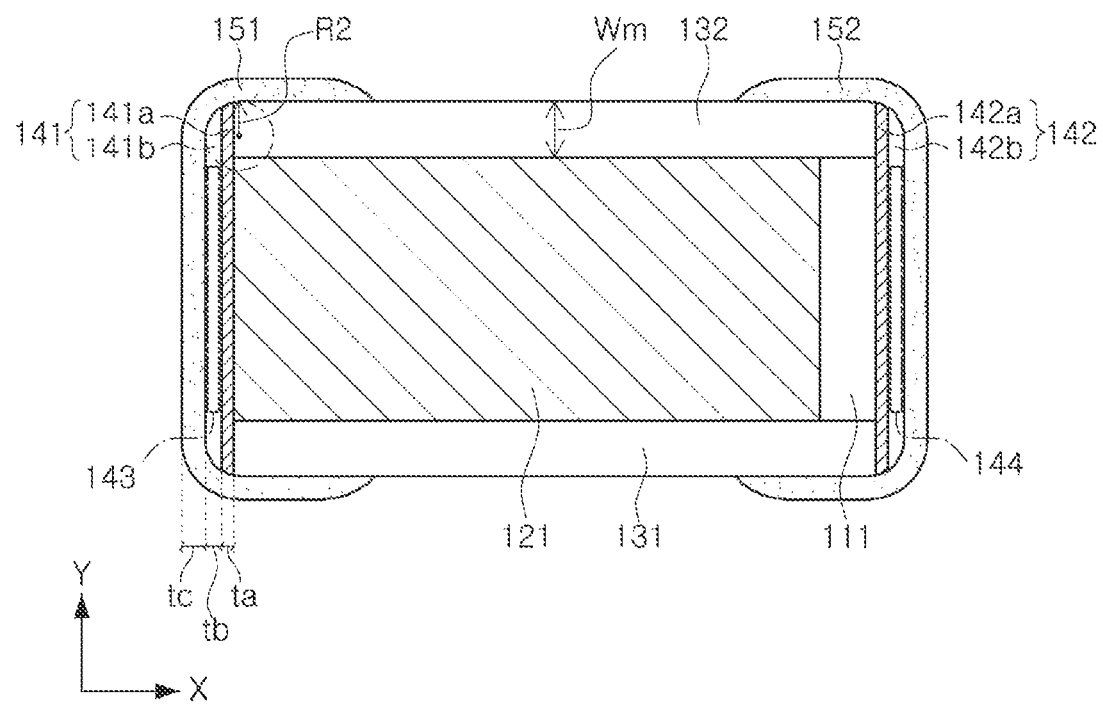
FIGS. 5A and 5B are cross-sectional diagrams taken in an X direction and a Y direction illustrated in FIG. 1.
Figure 5B:
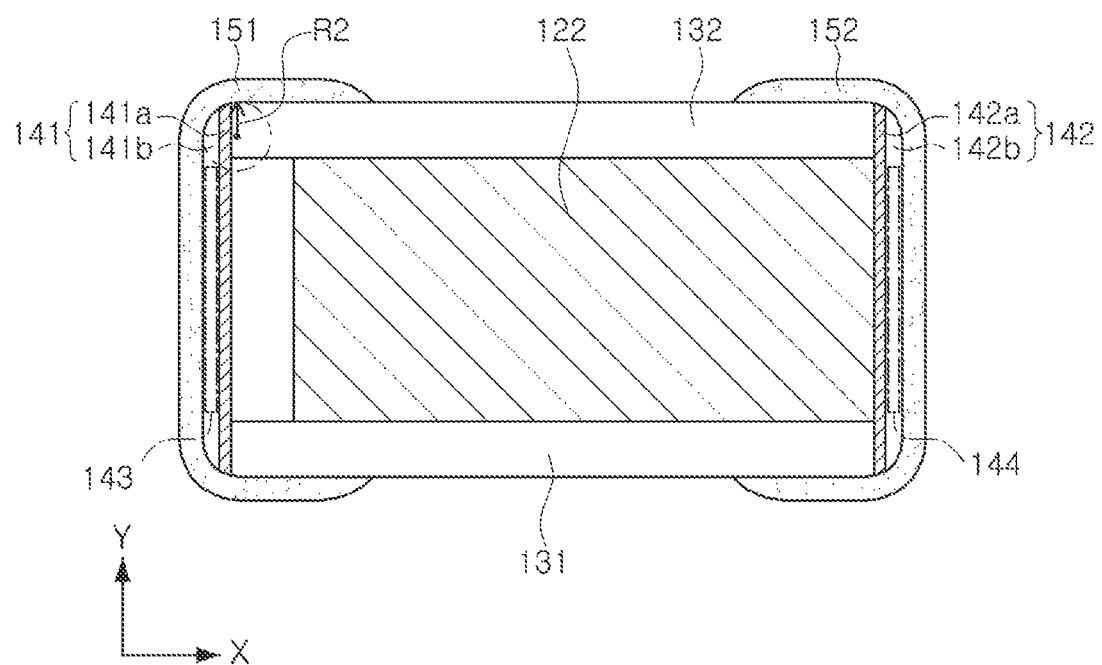

Referring to FIGS. 5A and 5B, when a thickness of each of the first and second margin portions 131 and 132 is defined as Wm, and a radius of curvature of a corner of the body on the cross-sectional surfaces taken in the second and third directions (an X-Y cross-sectional surface and an L-W cross-sectional surface) is defined as R2, R2/Wm may be 0.3 or greater and 1.4 or lower. When R2/Wm is less than 0.3, a sufficiently rounded shape may not be formed such that a chipping defect may occur or a thickness of an external electrode on the corner portion may decrease. When R2/Wm exceeds 1.4, a short caused by exposure of an internal electrode may occur, or it may be difficult to form an external electrode. A short caused by exposure of an internal electrode may refer to a phenomenon in which, as the corners of the body are ground, the first internal electrode 121 may be exposed to a surface on which the second external electrode 152 is disposed and may be connected to the second external electrode 152, or in which the second internal electrode 122 may be exposed to a surface on which the first external electrode 151 is disposed and may be connected to the first external electrode 151.

R2/Wm may be greater than 1.0 and 1.4 or lower.

When the connecting portions 141 and 142 are not provided, and R2/Wm is controlled to be greater than 1.0, it may be highly likely that a short caused by exposure of an internal electrode may occur. However, when the connecting portions 141 and 142 are provided as in an exemplary embodiment of the present disclosure, a possibility of a short caused by exposure of an internal electrode may significantly decrease even when R2/Wm is controlled to be greater than 1.0 and 1.4 or less.

To easily perform a grinding process, the radius of curvature R2 of the corner of the body 100 on the cross-sectional surfaces taken in the second and third directions may be configured to be the same as a radius of curvature R1 of the corner of the body 100 on the cross-sectional surfaces taken in the first and second directions, but an exemplary embodiment thereof is not limited thereto. The corners of the body 100 may be ground such that R2 and R1 may be configured to be different.

As the first and second connecting portions 141 and 142 may be formed using a transcribing process after forming the first and second margin portions 131 and 132 in the layered portion 110, the first connecting portion 141 may be disposed to cover one surfaces of the first and second margin portions 131 and 132 taken in the second direction (X direction), and the second connecting portion 142 may be disposed to cover the other surfaces of the first and second margin portions 131 and 132 taken in the second direction (X direction).

The first connecting portion 141 may be disposed within the layered portion 110 and one surfaces of the first and second margin portions 131 and 132 taken in the second direction (X direction), and the second connecting portion 142 may be disposed within the layered portion 110 and the other surfaces of the first and second margin portions 131 and 132 taken in the second direction (X direction). Accordingly, the first connecting portion 141 may not extend to both surfaces of the layered portion 110 taken in the first direction (Z direction), and may not extend to both surfaces of the first and second margin portions 131 and 132 taken in the third direction (Y direction).

The first and second external electrodes 151 and 152 may be disposed on the first and second connecting portions 141 and 142, respectively. The first external electrode 151 may be electrically connected to the first internal electrode 121 through the metal layer 141a and the exposed portion 143 of the first connecting portion 141, and the second external electrode 152 may be electrically connected to the second internal electrode 122 through the metal layer 142a and the exposed portion 144 of the second connecting portion 142.

The first and second external electrodes 151 and 152 may extend to both surfaces of the first and second connecting portions 141 and 142 taken in the first direction (Z direction), and the metal layers 141a and 142a of the first and second connecting portions 141 and 142 may be exposed to the surfaces of the first and second connecting portions 141 and 142 taken in the first direction (Z direction) and may be connected to the first and second external electrodes 151 and 152, respectively. The first and second external electrodes 151 and 152 may also extend to both surfaces of the first and second connecting portions 141 and 142 taken in the third direction (Y direction), and the metal layers 141a and 142a of the first and second connecting portions 141 and 142 may also be exposed to the surfaces of the first and second connecting portions 141 and 142 taken in the third direction (Y direction) and may be connected to the first and second external electrodes 151 and 152, respectively.

The first and second external electrodes 151 and 152 may extend to portions of the first surface 1 and the second surface 2 of the body 100. The first and second external electrodes 151 and 152 may also extend to portions of the fifth surface 5 and the sixth surface 6 of the body 100.

A method of forming the first and second external electrodes 151 and 152 may not be limited to any particular method. For example, the first and second external electrodes 151 and 152 may be formed by dipping the body 100 in a paste including a conductive metal and glass, or by transcribing a dried film formed by drying a metal paste on the first and second connecting portions.

In an exemplary embodiment of the present disclosure, as each of the corners of the body 100 has a rounded shape, even when an external electrode is formed using a dipping process, the phenomenon in which a thickness of each of the external electrodes 151 and 152 on the corners of the body 100 decreases may be prevented.

Also, when the external electrodes are formed through the transcribing process using the above-described dried film, the external electrodes may have a uniform thickness.

Thus, when a thickness of each of the external electrodes 151 and 152 is defined as tc, a ratio of a minimum value of the thickness tc to a maximum value may be 0.8 to 1.0.

In an exemplary embodiment of the present disclosure, a thickness of each of the external electrodes 151 and 152 may be within a range of 5 µm to 25 µm. For example, a thickness of each of the external electrodes 151 and 152 may be 5 µm or higher, 6 µm or higher, 7 µm or higher, 8 µm or higher, 9 µm or higher, or 10 µm or higher, and may be 25 µm or lower, 24 µm or lower, 23 µm or lower, 22 µm or lower, 21 µm or lower, or 20 µm or lower. However, an example of the thickness is not limited thereto. As a thickness of each of the external electrodes 151 and 152 satisfies the above-described ranges, the capacitor component may have improved mounting properties and electrical conductivity, and may have a reduced size.

In an exemplary embodiment of the present disclosure, the external electrodes 151 and 152 may include one or more of silver (Ag), palladium (Pd), gold (Au), platinum (Pt), nickel (Ni), tin (Sn), copper (Cu), tungsten (W), titanium (Ti), and alloys thereof. When the external electrodes 151 and 152 include nickel among the above-mentioned elements, connectivity with the metal layers of the first and second connecting portions, electrically connected to the first and second external electrodes 151 and 152, may improve, and electrical conductivity may improve.

To improve mounting properties with a substrate, a plating layer may be formed on the first and second external electrodes 151 and 152. For example, the plating layer may be implemented as an Ni-plated layer or an Sn-plated layer, and the Ni-plated layer and the Sn-plated layer may be formed in order on the external electrodes. Alternately, the first and second external electrodes 151 and 152 may include a plurality of the Ni-plated layers and/or a plurality of the Sn-plated layers.

FIGS. 8 to 11 are diagrams illustrating processes of forming a connecting portion 141 of a capacitor component by a transcribing process according to an exemplary embodiment of the present disclosure.

Figure 8:
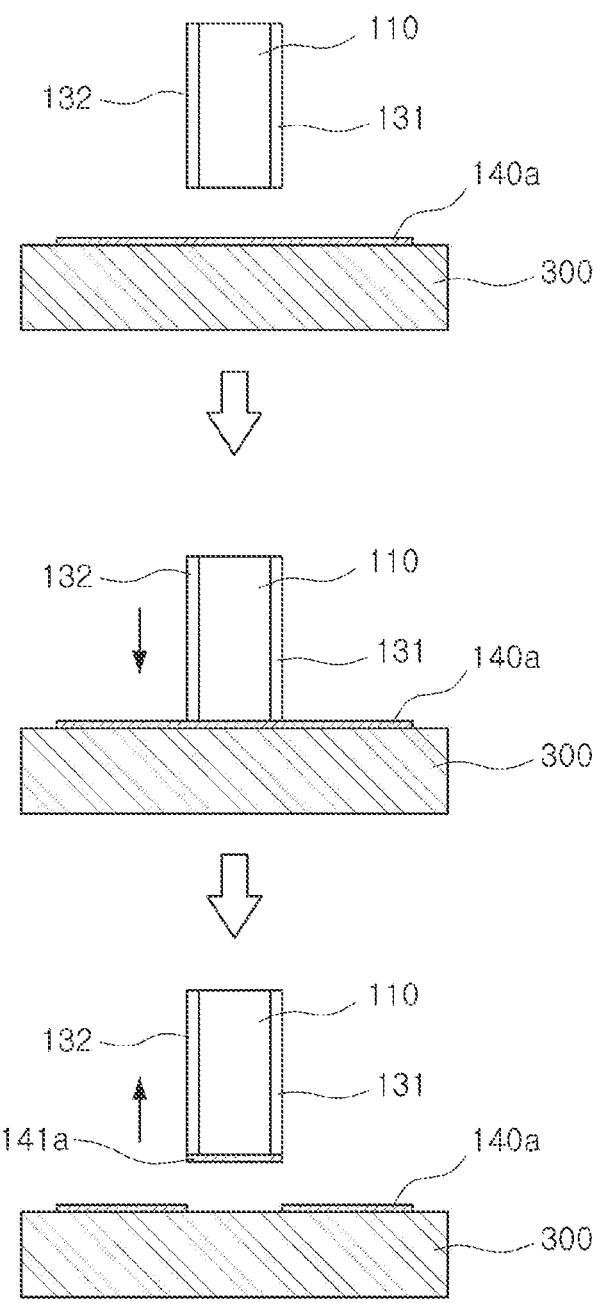
FIGS. 8 to 11 are diagrams illustrating processes for forming a connecting portion of a capacitor component using a transcribing method according to an exemplary embodiment of the present disclosure.

As illustrated in FIG. 8, in a process of transcribing a metal layer 141a, a metal layer sheet 140a may be arranged on a support stand 300, a layered portion 110 may be compressed to the metal layer sheet 140a such that the metal layer 141a may be attached to a surface of the layered portion 110. The metal layer sheet 140a, which has not been sintered yet, may include components such as a binder, an organic solvent, and the like.

Figure 9:
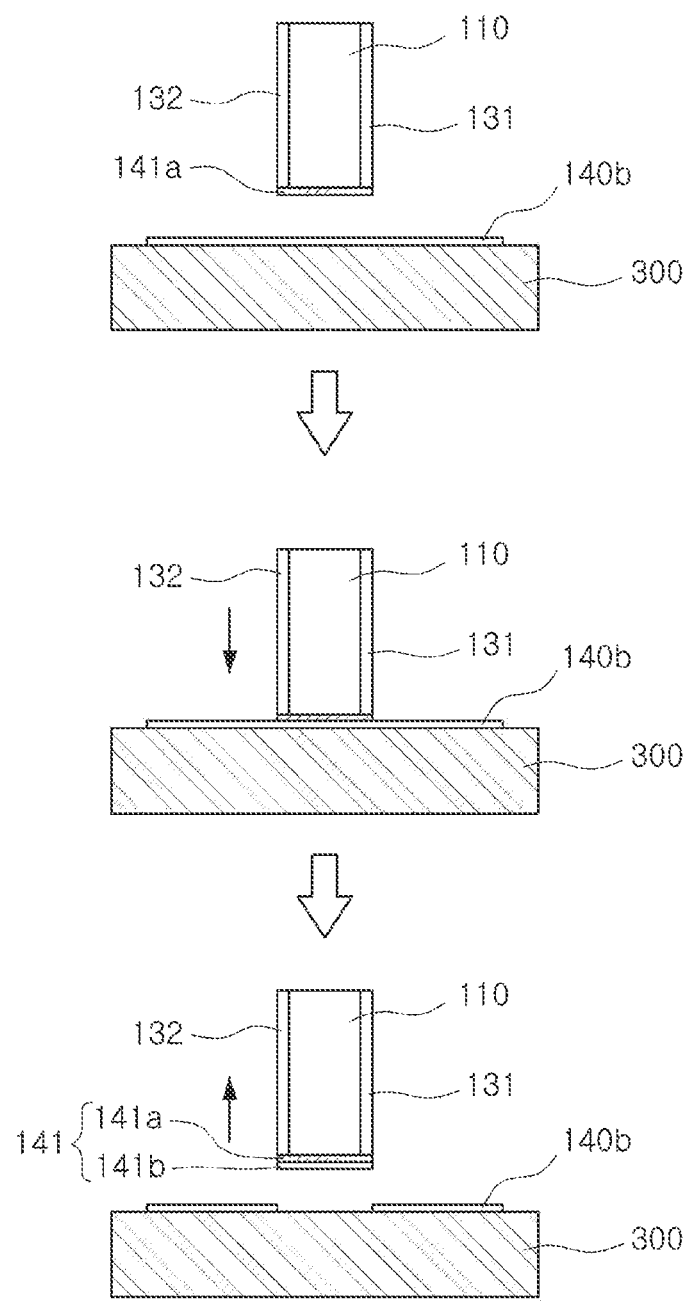

As illustrated in FIG. 9, a ceramic layer sheet 140b may be arranged on the support stand 300, the layered portion 110 may be compressed to the ceramic layer sheet 140b such that a ceramic layer sheet 141b may be attached to a surface of the metal layer 141a. The ceramic layer sheet 140b, which has not been sintered yet, may include components such as a binder, an organic solvent, and the like.

Figure 11:
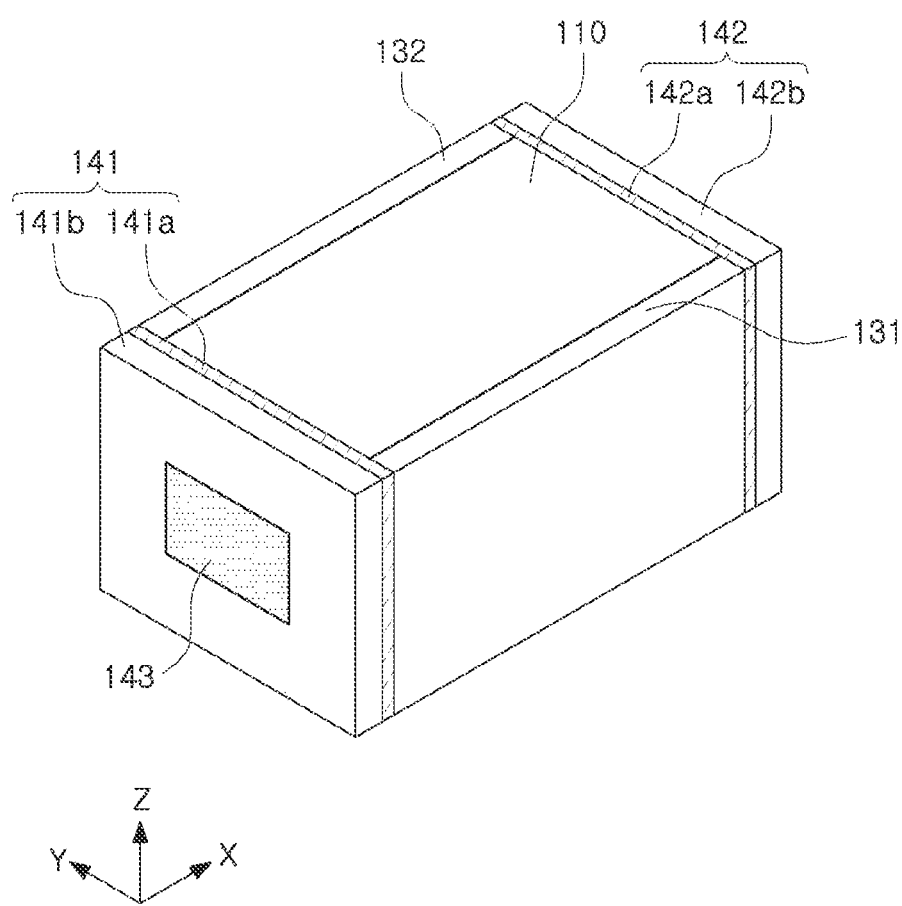

The same process may be performed on the other surface opposing the surface on which the metal layer 141a and the ceramic layer sheet 141b are disposed to form a metal layer 142a and a ceramic layer sheet 142b, thereby manufacturing the body 100 as illustrated in FIG. 11.

Figure 12:
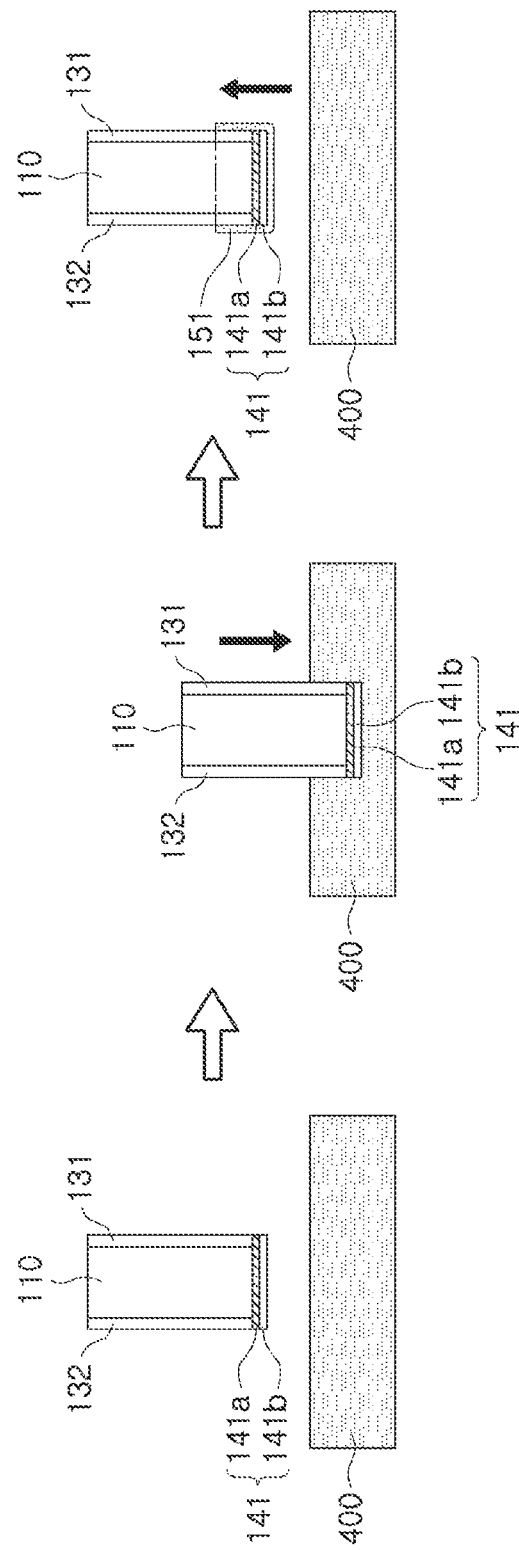
FIG. 12 is a diagram illustrating processes for forming an external electrode on a connecting portion of a capacitor component according to an exemplary embodiment of the present disclosure.

Each of corners of the body may be processed to have a rounded shape by performing a grinding process, and external electrodes 151 and 152 may be formed by dipping the ground body 100 into a conductive paste, as illustrated in FIG. 12, thereby manufacturing a capacitor component 10.

Figure 10:
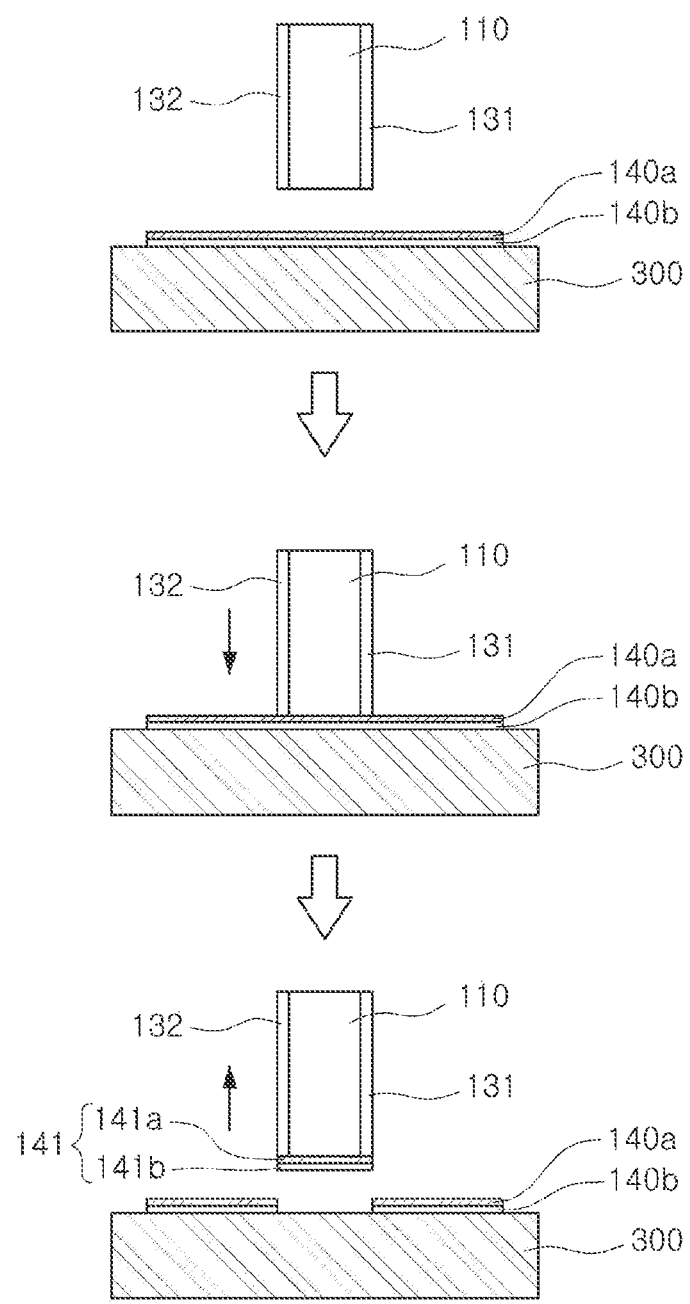

As illustrated in FIG. 10, the first connecting portion 141 may also be formed by layering both of the ceramic layer sheet 140b and the metal layer sheet 140a on the support stand 300 and performing a single transcribing process, rather than separately transcribing the metal layer and the ceramic layer.

According to the aforementioned exemplary embodiments of the present disclosure, by disposing the connecting portions in the layered portion, capacitance per unit volume of the capacitor component may improve, and moisture resistance reliability may improve.

Also, each of the corners of the body may have a sufficiently rounded shape, and when the each of the corners of the body has a sufficiently rounded shape, each of the external electrodes may have a uniform and reduced thickness.

Further, by improving electrode connectivity between the internal electrode and the external electrode, the capacitor component having reduced ESR may be provided.

In addition, by improving contact properties between the external electrode and the connecting portion, delamination may be prevented in the capacitor component.

While the exemplary embodiments have been shown and described above, it will be apparent to those skilled in the art that modifications and variations could be made without departing from the scope of the present invention as defined by the appended claims.

What is claimed is:

1. A capacitor component, comprising:
a body comprising:
a layered portion including alternately stacked first internal electrodes and second internal electrodes laminated with dielectric layers interposed therebetween in a first direction; and
first and second connecting portions disposed on two opposing surfaces of the layered portion, respectively, in a second direction perpendicular to the first direction and electrically connected to the first and second internal electrodes, respectively,
wherein the first and second connecting portions each include a metal layer disposed on the layered portion, a ceramic layer disposed on the metal layer, and an exposed portion penetrating through the ceramic layer to be in contact with the metal layer, and
wherein the ceramic layer does not overlap the metal layer in a third direction perpendicular to the first and second directions.

2. The capacitor component of claim 1, further comprising
first and second external electrodes disposed on the first and second connecting portions, respectively.

3. The capacitor component of claim 2, wherein the first and second external electrodes extend onto at least a portion of two opposing surfaces of the body, respectively, in the first direction, and further extend onto at least a portion of two opposing surfaces of the body, respectively, in a third direction perpendicular to the first and second directions.

4. The capacitor component of claim 2, wherein the first and second external electrodes include nickel (Ni).

5. The capacitor component of claim 2, further comprising plating layers disposed on the first external electrode and the second external electrode, respectively.

6. The capacitor component of claim 5, wherein the plating layers include at least one of a nickel (Ni) plating layer or a tin (Sn) plating layer.

7. The capacitor component of claim 6, wherein the plating layers include one or more nickel (Ni) plating layers and one or more tin (Sn) plating layers, and
a nickel (Ni) plating layer of the one or more nickel (Ni) plating layers and a tin (Sn) plating layer of the one or more tin (Sn) plating layers are sequentially disposed on each of the first and second external electrodes.

8. The capacitor component of claim 6, wherein the plating layers include a plurality of nickel (Ni) plating layers and a plurality of tin (Sn) plating layers.

9. The capacitor component of claim 1, wherein each exposed portion of the first and second connecting portions has a rounded shape or an oval shape.

10. The capacitor component of claim 1, wherein each exposed portion of the first and second connecting portions has a square shape or a rectangular shape.

11. The capacitor component of claim 1, wherein each of at least one of the first connecting portion or the second connecting portion includes two or more exposed portions penetrating through the ceramic layer.

12. A capacitor component, comprising:
a body comprising:
a layered portion including alternately stacked first internal electrodes and second internal electrodes laminated with dielectric layers interposed therebetween in a first direction;
first and second metal layers disposed on two opposing surfaces of the layered portion, respectively, in a second direction perpendicular to the first direction and electrically connected to the first and second internal electrodes, respectively;
first and second exposed portions respectively disposed on central portions of outer surfaces of the first and second metal layers; and
first and second ceramic layers respectively disposed on remaining portions of the outer surfaces of the first and second metal layers, the remaining portions surrounding the central portions, respectively,
wherein the first and second ceramic layers do not overlap the first and second metal layers, respectively, in a third direction perpendicular to the first and second directions.

13. The capacitor component of claim 12, further comprising:
first and second external electrodes disposed on the first and second exposed portions to be connected to the first and second metal layers, respectively.

14. The capacitor component of claim 13, wherein the first and second external electrodes are electrically connected to the first and second metal layers through the first and second exposed portions, respectively.

15. The capacitor component of claim 13, wherein the first and second external electrodes extend onto at least a portion of two opposing surfaces of the body, respectively, in the first direction, and further extend onto at least a portion of two opposing surfaces of the body, respectively, in a third direction perpendicular to the first and second directions.

16. The capacitor component of claim 13, wherein the first and second external electrodes include nickel (Ni).

17. The capacitor component of claim 13, further comprising plating layers disposed on the first external electrode and the second external electrode, respectively.

18. The capacitor component of claim 17, wherein the plating layers include at least one of a nickel (Ni) plating layer or a tin (Sn) plating layer.

19. The capacitor component of claim 18, wherein the plating layers include one or more nickel (Ni) plating layers and one or more tin (Sn) plating layers, and a nickel (Ni) plating layer of the one or more nickel (Ni) plating layers and a tin (Sn) plating layer of the one or more tin (Sn) plating layers are sequentially disposed on each of the first and second external electrodes.

20. The capacitor component of claim 18, wherein the plating layers include a plurality of nickel (Ni) plating layers and a plurality of tin (Sn) plating layers.

21. The capacitor component of claim 12, wherein each of the first and second exposed portions has a rounded shape or an oval shape.

22. The capacitor component of claim 12, wherein each of the first and second exposed portions has a square shape or a rectangular shape.

23. The capacitor component of claim 12, wherein two or more exposed portions are disposed to penetrate through each of at least one of the first ceramic layer or the second ceramic layer.

* * * * *